April 20, 1926.

H. BALDWIN 1,581,667

COMBINATION SALT AND PEPPER SHAKER

Filed Dec. 6, 1922

Inventor
Herbert Baldwin

Attorney

Patented Apr. 20, 1926.

1,581,667

UNITED STATES PATENT OFFICE.

HERBERT BALDWIN, OF MOUNTAIN, WISCONSIN; FLORENCE BALDWIN EXECUTRIX OF SAID HERBERT BALDWIN, DECEASED.

COMBINATION SALT AND PEPPER SHAKER.

Application filed December 6, 1922. Serial No. 605,227.

*To all whom it may concern:*

Be it known that I, HERBERT BALDWIN, a citizen of the United States, residing at Mountain, in the county of Oconto and State of Wisconsin, have invented certain new and useful Improvements in Combination Salt and Pepper Shakers, of which the following is a specification.

This invention relates to a combination salt and pepper shaker of the type set forth and described by me in a previous patent application filed December 6, 1922, Serial No. 605,226, and provides certain improvements over the former having special advantages as hereinafter set forth.

The primary purpose of the invention is to provide a condiment holder of the character referred to having spring operated closure means for dispensing the condiment therefrom and so constructed as to permit convenient access to the spring-action means whenever desired for purposes of repairs or otherwise.

A further and additional object is to provide a condiment holder of generally improved construction and design and which presents a combination receptacle of pleasing and attractive appearance.

Various other objects and advantages of the invention will become apparent from the following disclosure.

Figure 3:
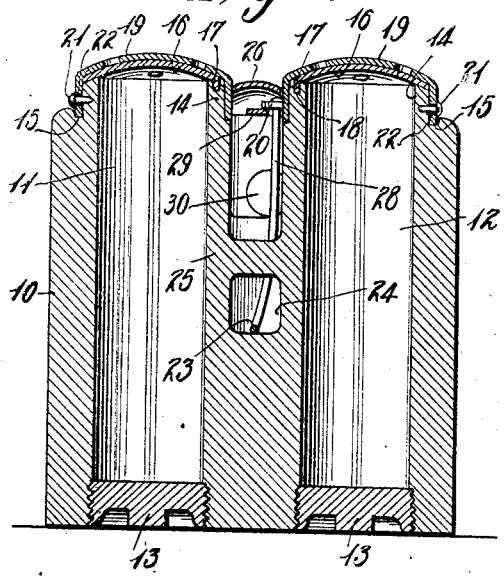
Figure 3 is a vertical central longitudinal section thru the holder.

The casing 10 of the holder may be of any suitable size or shape and of any selected or preferred material, such as glass, metal and the like. Spaced parallel compartments 11 and 12 extend longitudinally thru the body and serve to contain the condiments which are inserted therein from the bottom of the holder, suitable plugs 13 serving to close the lower ends of the compartments. Each compartment is provided, at its upper end, with a neck portion 14 and a circular groove 15 at the base of the neck. Arranged over the upper opening of each bore and supported by the neck thereof is a perforated plate 16 having a struck out tongue 17 which engages in a notch 18 in the neck to prevent the turning of the plate on the latter. Arranged over each perforated plate 16 is a rotary cap 19 which is adapted to be seated in the groove 15 at the base of the neck as shown to advantage in Figure 3. Cap 19 has a radially projecting finger by means of which it is reciprocated, the extent of its reciprocation being limited by a stop pin 21 carried by the neck and working in a short slot 22 of the cap. Each cap is provided with a series of perforations adapted to be brought at times into registry with the perforations of plate 16 to permit the contents of the compartment to be discharged therethru.

Figure 1:
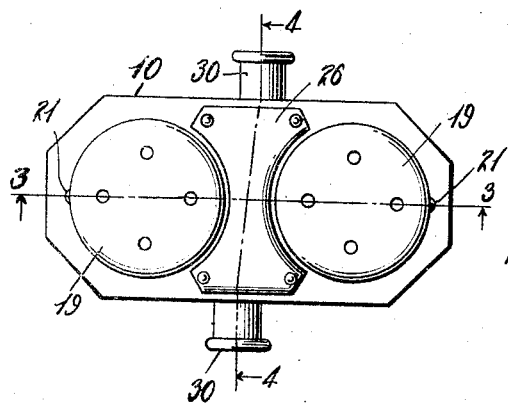
Figure 1 is a top plan view of the proposed article.
Figure 2:
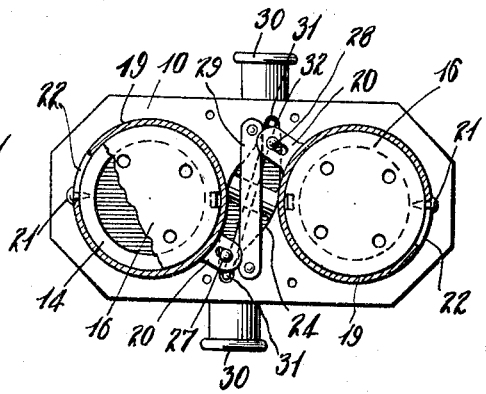
Figure 2 is a similar view thereof with the cap and top plate removed to expose the spring action.

The reciprocation of the cap 19 is accomplished by means of a U-shaped spring 23 which is accommodated in a suitable pocket 24 provided in the central wall or partition 25 of the holder which separates compartments 11 and 12 from each other. Pocket 24 opens upwardly thru the top of the holder and between neck portions 14, being normally carried by a suitable plate 26 which also serves as a guard or cover for the fingers 20 of cap 19. As will be seen from Figure 2 pocket 24 extends diagonally between compartments 10 and 11 of the holder so that the arms 27 and 28 of the spring are offset to one another and are, hence, capable of passing laterally of each other when flexed inwardly.

Arm 27 of the spring engages fingers 20 of the cap associated with compartment 11 while arm 28 engages the finger of the cap associated with compartment 10, the arrangement being such that when the spring arms are flexed inwardly the two caps will be so turned that the perforations thereof will register with the perforations of plate 16 whereby the contents of the compartments can be readily dispensed from the holder. A guide strip 29 spans the upper end of pocket 24 between the arms of the springs and is secured to the top of the holder as illustrated. The opposite sides of the pocket, it is to be observed, extend in an outward curve between opposite terminals of the pocket and provide cam-surfaces which guide the arms of the spring in the inward movement of the latter.

Figure 4:
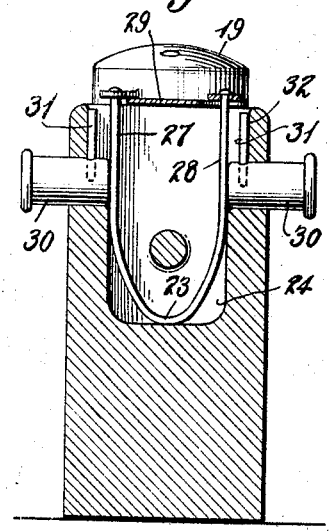
Figure 4 is a vertical transverse section taken along line 4—4 of Figure 1.

Push buttons 30 are provided on opposite sides of the holder for flexing the arms of spring 23, these buttons sliding in openings communicating with opposite ends of pocket 24 and in line with the arm of the spring so that the inner ends of the button will bear against the same as shown in Figure 4. The tendency of arms 27 and 28 of the springs to keep apart normally serves to hold the button in the position illustrated, in which location of the parts the perforations of the cap and plate will be out of register so that no condiment will be dispensed from the holder. Stop pins 31 carried by the button and accommodated in the grooves 32 at each end of the pocket prevents the buttons from being ejected entirely out of the holder. Buttons 30 may be operated separately or jointly and when pushed inwardly will cause the arms of the springs to come together and at the same time turning caps 19 to open compartments 11 and 12. Upon relieving the pressure on the button, the reaction of the spring will return the parts to normal position.

As the various parts of the device may be readily detached from the holder it is obvious that access to the various moving parts of the operating means may be conveniently had, and the part replaced or changed without any difficulty.

From the foregoing it is believed that the advantages and novel features of the invention will be readily understood and that further detail description will not be necessary.

What is claimed is:

A condiment holder comprising a casing having a partition dividing the same into separate compartments, said partition being formed with an open pocket extending diagonally between the respective compartments, each side of the pocket extending in an outward curve between opposite terminals of the pocket to provide guide surfaces, a fixed perforated plate arranged over the respective compartments, a perforated rotary cap arranged over each perforated plate, a U-shaped spring seated in the said pocket with its upper terminals operatively engaged with the said rotary caps, the arms of the said spring being positioned for movement along opposite guide surfaces of the pocket, and push buttons on opposite sides of the casing and extending through openings communicating with opposite ends of the pocket for engagement with the respective arms of the spring.

In testimony whereof I affix my signature.

HERBERT BALDWIN.